United States Patent [19]
Saita et al.

[11] Patent Number: 5,882,542
[45] Date of Patent: Mar. 16, 1999

[54] SODIUM SULFATE BASE HEAT-STORAGE COMPOSITION AND PROCESS FOR PRODUCING THE SAME

[75] Inventors: Kenji Saita; Yutaka Suzuki, both of Ibaraki, Japan

[73] Assignee: Sumitomo Chemical Company, Limited, Osaka, Japan

[21] Appl. No.: 734,150

[22] Filed: Oct. 21, 1996

Related U.S. Application Data

[63] Continuation of Ser. No. 313,188, Dec. 28, 1994, abandoned.

[30] Foreign Application Priority Data

Feb. 12, 1993 [JP] Japan ..................................... 5-024105

[51] Int. Cl.$^6$ ............................... C09K 5/00; C09K 5/06
[52] U.S. Cl. ............................................... 252/70; 165/10
[58] Field of Search .......................... 252/70; 165/10 A, 165/10

[56] References Cited

U.S. PATENT DOCUMENTS

| | | | |
|---|---|---|---|
| 4,209,413 | 6/1980 | Kent et al. ................................. | 252/70 |
| 4,349,446 | 9/1982 | Marks ......................................... | 252/70 |
| 4,619,778 | 10/1986 | Chalk et al. ............................... | 252/70 |

FOREIGN PATENT DOCUMENTS

| | | |
|---|---|---|
| 57-153078 | 9/1982 | Japan . |
| 59-53577 | 3/1984 | Japan . |
| 61-111389 | 5/1986 | Japan . |
| 2-92988 | 4/1990 | Japan . |
| 92988 | 4/1990 | Japan . |
| 2110708 | 6/1983 | United Kingdom . |
| 2252327 | 8/1992 | United Kingdom . |

*Primary Examiner*—Christine Skane
*Attorney, Agent, or Firm*—Sughrue, Mion, Zinn, Macpeak & Seas, PLLC

[57] ABSTRACT

A heat-storage composition containing: (1) sodium sulfate, ammonium chloride and water, (ii) a water swellable crosslinked polymer or a water-soluble acrylic polymer, and (iii) a surfactant having a polyoxyalkylene chain, and a process for producing the composition. The heat-storage composition has a melting point and a freezing point in a temperature range suitable for cooling in air conditioning, and also has the stability necessary for withstanding repetitions of melting/freezing in long-term use.

2 Claims, 2 Drawing Sheets

SODIUM SULFATE BASE HEAT-STORAGE COMPOSITION AND PROCESS FOR PRODUCING THE SAME

This is a Continuation of Application Ser. No. 08/313, 188 filed Dec. 28, 1994 now abandoned, which is a U.S.C. 371 PCT/JP94/00203, filed Feb. 10, 1994 published as WO94/18283 Aug. 18, 1994.

TECHNICAL FIELD

The present invention relates to a composition for latent heat storage material to be used for cooling in the air conditioning of buildings, etc., and to a process for producing the same.

BACKGROUND ART

The requirements that a heat-storage material should satisfy include to have a large amount of stored heat, to function at a given temperature level, to be stable over a prolonged period, to be inexpensive, to be non-toxic, to be non-corrosive, etc. As substances that meet these requirements, salt hydrates undergoing a phase change are the most frequently investigated, of which sodium sulfate decahydrate is representative.

Since sodium sulfate decahydrate has a melting point of 32° C. and a latent heat of 60 cal/g, a large number of attempts to utilize it as a heat-storage material have so far been made since 1952 when sodium tetraborate decahydrate ($Na_2B_4O_7 \cdot 10H_2O$) was found to be effective as a supercooling inhibitor to be used in combination therewith.

A problem encountered in investigations for practical use is that sodium sulfate decahydrate shows incongruent melting. That is, upon melting, anhydrous sodium sulfate forms and precipitates at a bottom of the liquid. When this is cooled, the surface layer of the precipitated anhydrous salt regains water to return to the salt decahydrate but the inner part remains as the anhydrous salt. Since the remaining anhydrous salt does not contributes to the phase change, amount of the stored heat decreses. In order to overcome this, various methods have been investigated for dispersing and holding the anhydrous salt in the liquid without permitting it to precipitate to the bottom of the liquid. In these methods, precipitation is prevented by increasing the viscosity by means of an additive which is either an inorganic compound or an organic polymer.

For example, methods comprising using various inorganic compounds were attempted as described in Unexamined Published International Application Sho-55-501180 and JP-A-53-34687. However, they failed to always achieve the sufficient effect of preventing precipitation. (The term "JP-A" used herein means an unexamined published Japanese patent application.)

Further, although methods comprising using a water-soluble polymer, e.g., poly(sodium acrylate), or a crosslinkable polymer as an organic polymer have been proposed in JP-B-57-30873, JP-B-57-48027, JP-A-58-132075, JP-A-59-102977, etc., these methods have not been always sufficient in long-term stability. (The term "JP-B" used herein means an examined Japanese patent publication.)

In JP-A-60-203687 is proposed a method for inhibiting the decrease of amount of stored heat in a Glauber's salt-based heat-storage material composition by adding a silicone anti-foaming agent and water containing a chelating agent to Glauber's salt. In this method, it is essential that a silicone anti-foaming agent and a chelating agent should coexist, and if both are absent, a decrease of amount of stored heat is observed after 500 heating cycles.

There also is a proposal of a heat-storage material obtained by adding a nucleating agent and a surfactant to a heat-storage material of the latent heat type and temporarily melting the resulting heat-storage material to uniformly disperse the nucleating agent (JP-A-62-297381). There is a description therein to the effect that since the nucleating agent is prevented from precipitating and is evenly dispersed due to the addition of a surfactant, solidification takes place homogeneously and the melted heat-storage material has intact flowability, so that workability is not impaired. However, because the nucleating agent dispersed in this manner is kept in the dispersed state by the electrostatic repulsion attributable to the surfactant, gravitational sedimentation during use over a prolonged period of several months or several years is unavoidable and it is difficult to maintain the uniformly dispersed state of the nucleating agent.

The present inventors, under these circumstances, previously proposed a heat-storage material composition and a process for producing the same, which composition does not undergo a decrease of amount of stored heat over a prolonged period due to the use of a crosslinked polymer obtained by polymerizing at least one monomer selected from an unsaturated carboxylic acid, an organic unsaturated sulfonic acid, and salts of these with a polyfunctional monomer (JP-A-62-25188).

On the other hand, in heat-storage materials for cooling in air conditioning, heat storage in ice has attracted attention for long and has come into practical use. This utilizes the great latent heat of fusion of ice (80 cal/g). However, there is a problem that cooling to −10° C. or below is necessary for ice production and this necessitates a special freezer, resulting in a heavy initial investment in equipment.

With respect to heat-storage materials comprising sodium sulfate as the main ingredient, investigations have been made on melting point regulators in order to lower the melting point to around 10° C. In U.S. Pat. No. 4,689,164 is proposed a system composed of a composition comprising sodium sulfate decahydrate and, per one mole of that salt, ¾ to 9/4 mole of ammonium chloride and ⅕ to ¼ mole of potassium chloride and, further including, a thixotropic agent and a nucleating agent. There is a description to the effect that this system has a melting point of 50° F. (10° C.) or below and a heat of fusion of 38–42 BTU/lb (21–23 cal/g). This system, however, has a problem that the melting point is so apart from the solidifying point that it should be cooled to 3° C. or below for solidification.

Accordingly, an object of the present invention is to overcome the problems of the prior art techniques described above. That is, the present invention provides a heat-storage material composition which undergoes a phase change between solid and liquid phases in the range of working temperatures for freezers generally employed for cooling in air conditioning (6°–14° C.), and which is free from a decrease of amount of stored heat over a prolonged period.

DISCLOSURE OF THE INVENTION

The present invention comprises the following inventions:

1. A heat-storage composition comprising, as major components, (i) 85.0–99.5 parts by weight of an inorganic salt composition containing sodium sulfate and, per one mole of the sodium sulfate (in terms of its anhydride), 1.5–2.5 mole of ammonium chloride and 10–27 mole of water, (ii) 0.5–15.0 parts by weight of a water swellable crosslinked polymer and (iii) 0.01–5.0 parts by weight of a surfactant having a polyoxyalkylene chain.

2. A heat-storage composition comprising, as major components, (i) 90.0–99.5 parts by weight of an inorganic salt composition containing sodium sulfate and, per one mole of the sodium sulfate (in terms of its anhydride), 1.7–2.2 mole of ammonium chloride and 10–27 mole of water, (ii) 0.5–10.0 parts by weight of a water swellable crosslinked polymer swelling in water, and (iii) 0.01–5.0 parts by weight of a surfactant having a polyoxyethylene chain.

3. A heat-storage composition comprising, as major components, (i) 85.0–99.5 parts by weight of an inorganic salt composition containing sodium sulfate and, per one mole of the sodium sulfate (in terms of its anhydride), 1.5–2.5 mole of ammonium chloride and 10–27 mole of water, (ii) 0.5–15.0 parts by weight of a water-soluble acrylic polymer, and (iii) 0.01–5.0 parts by weight of a surfactant having a polyoxyalkylene chain.

4. A heat-storage composition according to claim (1) or (2), wherein the water swellable crosslinked polymer is a water-absorbing resin.

5. A heat-storage composition according to claim (1) or (2), wherein the water swellable crosslinked polymer according to claim is a polymer obtained by polymerizing at least one monomer selected from an unsaturated carboxylic acid, an organic unsaturated sulfonic acid, salts thereof, and acrylamide with a polyfunctional monomer.

6. A heat-storage composition according to claim (3), wherein the water-soluble acrylic polymer is at least one member selected from polyacrylamide, a partially hydrolyzed polyacrylamide, poly(sodium acrylate), and an acrylamide-sodium acrylate copolymer.

7. A process for producing the heat-storage composition according to claim (1), which is characterized in that at least one monomer selected from an unsaturated carboxylic acid, an organic unsaturated sulfonic acid, salts thereof, and acrylamide is polymerized with a polyfunctional monomer using a polymerization initiator in the presence of sodium sulfate, ammonium chloride, water, and a surfactant having a polyoxyalkylene chain.

8. A process for producing the heat-storage composition according to claim (2), which is characterized in that at least one monomer selected from an unsaturated carboxylic acid, an organic unsaturated sulfonic acid, and salts thereof is polymerized with a polyfunctional monomer using a polymerization initiator in the presence of sodium sulfate, ammonium chloride, water, and a surfactant having a polyoxyethylene chain.

9. A process for producing the heat-storage composition according to claim (2), which is characterized in that at least one monomer selected from an unsaturated carboxylic acid, an organic unsaturated sulfonic acid, and salts thereof is polymerized with acrylamide and a polyfunctional monomer using a polymerization initiator in the presence of sodium sulfate, ammonium chloride, water, and a surfactant having a polyoxyethylene chain.

10. A process for producing the heat-storage composition according to claim (2), which is characterized in that acrylamide is polymerized with a polyfunctional monomer using a polymerization initiator in the presence of sodium sulfate, ammonium chloride, water, and a surfactant having a polyoxyethylene chain.

11. A process according to claim (8), (9), or (10) for producing a heat-storage composition, which is character- ized in that the surfactant having a polyoxyethylene chain is at least one member selected from a polyoxyethylene alkyl ether sulfuric ester salt, a polyoxyethylene alkylphenyl ether sulfuric ester salt, a polyoxyethylene alkylamine, a polyoxyethylene sorbitan fatty acid ester, and a polyoxyethylene fatty acid ester.

12. A process according to claim (7), (8), or (9) for producing a heat-storage composition, wherein the monomer is a water-soluble monomer.

13. A process according to claim (7), (8), or (9) for producing a heat-storage composition, wherein the monomer is sodium acrylate or sodium methacrylate.

14. A process according to claim (7), (8), (9), or (10) for producing a heat-storage composition, wherein the polyfunctional monomer is a water-soluble polyfunctional monomer.

15. A process according to claim (7), (8), (9), or (10) for producing a heat-storage composition, wherein the polyfunctional monomer is N,N'-methylenebisacrylamide or N,N'-methylenebismethacrylamide.

BRIEF DESCRIPTION OF THE DRAWINGS

In FIG. 1, numeral 1 denotes a freezing curve in Example 1 and numeral 2 denotes a freezing curve in Comparative Example 1.

In FIG. 2, numeral 3 denotes a freezing curve in Example 5 and numeral 4 denotes a freezing curve in Comparative Example 5.

BEST MODES FOR CARRYING OUT THE INVENTION

Figure 1:
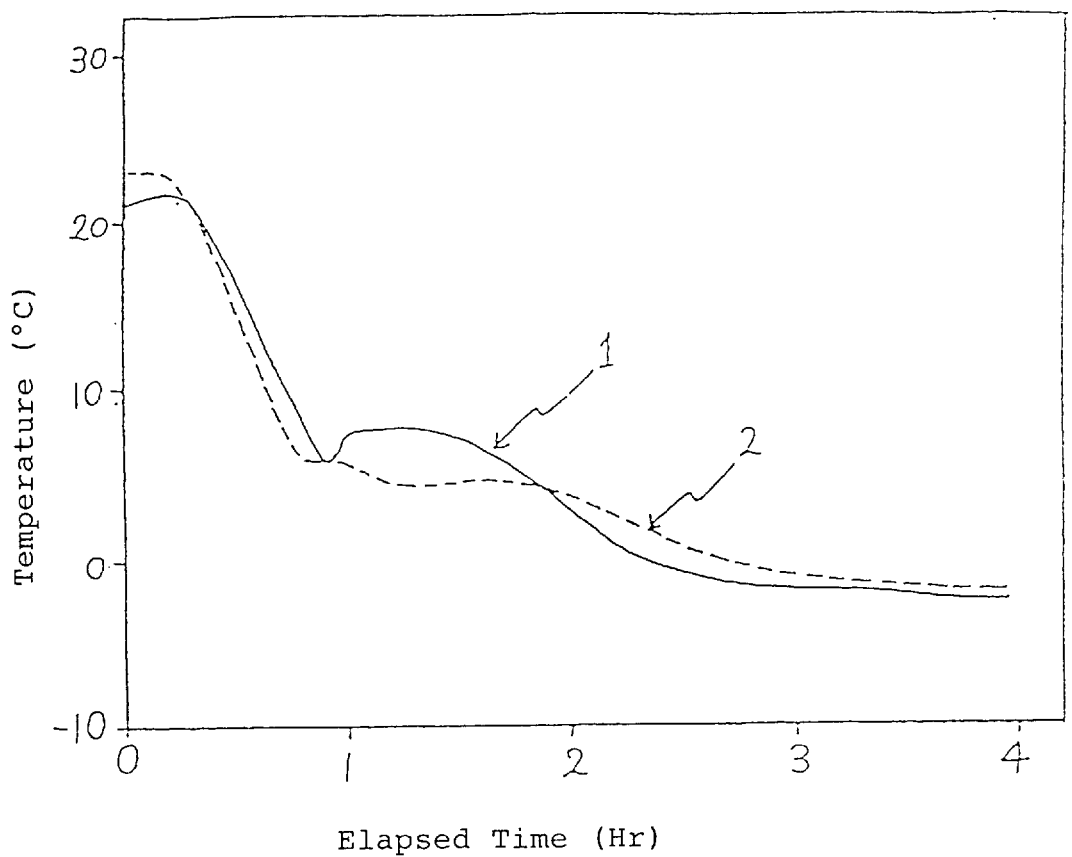
FIG. 1 illustrates freezing curves in the heating cycle tests comprising melting and freezing in Example 1 and Comparative Example 1.

The present invention will be explained below in detail.

As sodium sulfate as a starting material in this invention, either anhydrous sodium sulfate or sodium sulfate decahydrate may be used. Ammonium chloride is used for lowering the melting point, and the amount thereof to be used is 1.5–2.5 mole, preferably 1.7–2.2 mole, per one mole of the sodium sulfate (in terms of its anhydride). If the amount thereof is below 1.5 mole, the melting-point decrease is insufficient. Even if it is added in an amount above 2.5 mole, the effect of lowering the melting point is saturated.

It is also possible, in order to regulate the melting point, to add a conventionally known compound for melting-point regulation, such as sodium chloride, potassium chloride, sodium nitrate, potassium nitrate, magnesium nitrate, etc.

The amount of the water to be used is 10–27 mole, preferably 15–24 mole, per one mole of the sodium sulfate (in terms of its anhydride). Amounts below 10 mole is undesirable in that the amount of the sodium sulfate which regains water is reduced, resulting a decrease of amount of stored heat. Amounts above 27 mole are undesirable in that the effect of diluting the sodium sulfate is too high, resulting in a decrease of amount of stored heat.

The water swellable crosslinked polymer to be used in this invention, is a polymer which has a three-dimensional network structure and which swells due to interaction with water to form a so-called hydrogel. Among hydrogels, resins obtained from polymeric electrolytes have water-absorbing capacities as high as several tens to several hundreds of times their own weights and are called water-absorbing resins. These resins are preferred as the water swellable crosslinked polymer in this invention.

The water-absorbing resins are divided roughly into starch series, cellulose series, and synthetic-polymer series. The water-absorbing resins based on synthetic polymers include poly(acrylic acid) series, starch/poly(acrylic acid) series, poly(vinyl alcohol)/poly(acrylic acid) series, poly(vinyl alcohol) series, polyacrylamide series, polyoxyethylene series, and the like. These are described in detail in "Ko-kyusuisei Polymer (Highly Water-Absorbing Polymer)" Chapter 1 (written by Fusayoshi Masuda, published by Kyoritsu Shuppan, 1987).

In this invention, powder of the water-absorbing resins enumerated above may be used as the water-swelling crosslinked polymer. Since these are used in a concentrated solution of sodium sulfate, etc., they preferably are water swellable crosslinked polymers less apt to be affected by an electrolyte.

The water swellable crosslinked polymer or the water-soluble acrylic polymer which will be described later is used in an amount of 0.5–15.0 parts by weight per 85.0–99.5 parts by weight of the inorganic salt composition described above, preferably 0.5–10.0 parts by weight per 90.0–99.5 parts by weight of the inorganic salt composition described above. Amounts below 0.5 part by weight are undesirable in that the viscosity-increasing effect is low. Amounts above 15.0 parts by weight are undesirable in that the heat-storage composition has too high a viscosity and, hence, poor handling property.

Other examples of the water swellable crosslinked polymer include a crosslinked polymer obtained by polymerizing at least one monomer selected from an unsaturated carboxylic acid, an organic unsaturated sulfonic acid, salts of these, and acrylamide with a polyfunctional monomer using a polymerization initiator in the presence of the inorganic salt composition described above.

Examples of the unsaturated carboxylic acid include acrylic acid, methacrylic acid, hydroxyethylacrylic acid, itaconic acid, and the like. Examples of the organic unsaturated sulfonic acid include 2-acrylamido-2-methylpropanesulfonic acid, p-styrenesulfonic acid, sulfoethyl methacrylate, allylsulfonic acid, methallylsulfonic acid, and the like.

Preferred as salts of these are ones readily soluble in water, such as the alkali metal salts or the ammonium salts. Use of the sodium salts is more preferred. The most preferred is sodium acrylate or sodium methacrylate.

By using an unsaturated carboxylic acid, an organic unsaturated sulfonic acid, salts thereof, and acrylamide in varying proportions to copolymerize them, copolymers with different degrees of anionic nature can be obtained. There are cases where the degree of anionic nature influences the phase-change temperatures. For example, it is preferred that the proportion of acrylamide be 50–90% by mole.

The amount of these monomers to be used may be that corresponding to the amount of the above-described water-absorbing resin to be used. It is about 1–15% by weight, preferably 2–8% by weight, more preferably 3–6% by weight, based on the total amount of the heat-storage composition. If the amount is below 1% by weight, the viscosity is so low that the effect of preventing the precipitation of the anhydrous sodium sulfate resulting from a phase change is insufficient. If the monomers are used at an unnecessarily high concentration as high as above 15% by weight, a reduced amount of stored heat results.

The polyfunctional monomer is used for crosslinking the polymer. Use of a water-soluble polyfunctional monomer is preferred. Specific examples include N,N'-methylenebisacrylamide, N,N'-methylenebismethacrylamide, N,N'-dimethylenebisacrylamide, N,N'-dimethylenebismethacrylamide, and the like. Preferably, N,N'-methylenebisacrylamide or N,N'-methylenebismethacrylamide may be used. The amount thereof to be used is in the range of 0.005–0.2 mole, preferably in the range of 0.01–0.1 mole, per one mole of the monomer. Amounts below 0.005 mole are undesirable in that the crosslinking effect is insufficient. Amounts above 0.2 mole are undesirable in that the effect is not so high for such amounts.

As a result of the polymerization reaction which will be described later, the monomer and polyfunctional monomer described above yield a crosslinked polymer. The proportion of the crosslinked polymer to the heat-storage composition is the total of the above-described monomer and polyfunctional monomer used, i.e., 0.5–15.0 parts by weight per 85.0–99.5 parts by weight of the inorganic salt composition, preferably 0.5–10.0 parts by weight per 90.0–99.5 parts by weight thereof, more preferably 2–5.5 parts by weight per 94.5–98.0 parts by weight thereof.

As the polymerization initiator for use in the polymerization, generally known radical polymerization initiators may be used in an ordinary amount, such as diacyl peroxides, e.g., acetyl peroxide, lauroyl peroxide, and benzoyl peroxide, hydroperoxides, e.g., cumene hydroperoxide, alkyl peroxides, e.g., di-tert-butyl peroxide, ammonium or potassium peroxydisulfate, hydrogen peroxide, 2,2-azobisisobutyronitrile, etc. Of these, redox-type polymerization initiators are preferred because they are active at relatively low temperatures.

Of the ordinarily known redox-type polymerization initiators, water-soluble ones are suitable for use in this invention. The oxidizing agents include ammonium or potassium peroxydisulfate, hydrogen peroxide, etc., and the reducing agents include sodium thiosulfate, sodium sulfite, ferrous sulfate, etc. The temperature for the crosslinking polymerization is not lower than the melting point of either sodium sulfate decahydrate or a eutectic salt thereof, and is not always limited. However, the polymerization is usually conducted at 20°–50° C.

A redox-type polymerization initiator develops polymerization activity in a relatively short time upon mixing of the oxidizing and reducing agents which constitute the initiator. If the initiator comes into contact with oxygen in air after the development of polymerization activity, it is deactivated. It is therefore necessary that after the two ingredients are mixed, the initiator should be rapidly fed to the polymerization vessel so as to avoid contact with air as far as possible.

The process of the present invention can be carried out by various manners. For example, there is a method in which polymerization is conducted in a relatively large vessel and the heat-storage composition yielded is divided and packed into the containers of which the heat-storage part of a heating apparatus is constituted. The large vessel for polymerization is subjected to replacement with nitrogen gas, before the feedstock ingredients are mixed together and polymerized.

In the process of this invention, since the feedstock to be used does not contain a crosslinkable polymer or the like but monomers therefor, the mixing operation is easy.

There also is a method in which polymerization is conducted within a heat-storage container of a heating apparatus or the like. The feature of the present invention is especially well exhibited in the case of this method.

In the process of this invention, not a crosslinkable polymer or the like but monomers are used as the starting material and, hence, the mixed material to be subjected to polymerization is a liquid composition with low viscosity. Consequently, even when a large number of containers of a complicated shape are used, the mixed material can be easily injected thereinto. By the polymerization in the containers, the containment of a heat-storage material which is either a viscous liquid or a jelly-like solid in the containers of a complicated shape can be easily accomplished. When the mixed material is filled into containers and polymerized, it is not always necessary to replace the atmosphere in the containers with nitrogen.

In the case of using, for example, a redox initiator as the polymerization initiator, a suitable method for injecting the liquid composition to be subjected to polymerization into containers for containing a heat-storage material is a method in which the oxidizing agent and the reducing agent are continuously mixed in a flow system of the composition and injected in the containers.

Examples thereof include: a method in which during the course of the injection of a liquid composition comprising sodium sulfate or a eutectic salt thereof, monomers and water into containers, an oxidizing agent and a reducing agent are separately added; a method in which either of an oxidizing agent and a reducing agent is dissolved beforehand into the liquid composition and the other is added during the course of injection into containers; and a method which comprises dividing the liquid composition, dissolving beforehand an oxidizing agent into one liquid and a reducing agent into the other, and colliding the two liquids with each other in the injection line to containers to mix the liquids, before injecting the liquids into the containers.

For the purpose of conducting mixing more sufficiently, an in-line mixer may be disposed in the flow line for the liquids.

In the process of the present invention, for preventing the anhydrous sodium sulfate and other additives from precipitation in the containers during the period after the injection of the mixed material into the containers and before the viscosity is increased as a result of the progress of the polymerization reaction of the monomers, etc., a preferred method is to increase the viscosity of the aqueous medium beforehand by adding a thickening agent. As the thickening agent to be used for this purpose, generally known thickening agents of various kinds may be employed. Examples thereof include inorganic substances, e.g., fumed silica, wet-process fine silica powder, and clays, water-soluble polymers, e.g., poly(sodium acrylate), water-absorbing resins, and the like. The amount of the thickening agent to be used is about 0.1–7% by weight. That is, the thickening agent may be used in an amount which gives such a viscosity that the precipitation of the anhydrous sodium sulfate is prevented during the short time until the polymerization and crosslinking reactions of the monomers, etc. proceed to cause a viscosity increase and which does not impair flowability.

As the water-soluble acrylic polymer to be used in this invention, a polymer generally known as an acrylic-polymer coagulant may, for example, be employed. Specific examples thereof include polyacrylamide, a partially hydrolyzed polyacrylamide, poly(sodium acrylate), an acrylamide-sodium acrylate copolymer, and the like.

As the surfactant having a polyoxyalkylene chain to be used in this invention, any of the surfactants of that kind can be used without particular limitations as long as it has the effect of influencing the crystal form of sodium sulfate decahydrate. Examples thereof include a surfactant having a polyoxyethylene chain, a surfactant having a polyoxypropylene chain, and the like, with the surfactant having a polyoxyethylene chain being preferred.

As the surfactant having a polyoxyethylene chain to be used in this invention, an anionic, nonionic, or cationic surfactant having a polyoxyethylene chain may be employed. Examples of the anionic surfactant include a polyoxyethylene alkyl ether sulfuric ester salt, a polyoxyethylene alkylphenyl ether sulfuric ester salt, and the like.

Examples of the nonionic surfactant include a polyoxyethylene alkyl ether, a polyoxyethylene alkylallyl ether, a polyoxyethylene sorbitan fatty ester, a polyoxyethylene fatty ester, and the like.

Examples of the cationic surfactant include a polyoxyethylene alkylamine and the like.

The amount of these surfactants to be used is 0.01–5.0 parts by weight, preferably 0.05–5.0 parts by weight, per 90.0–99.5 parts by weight of the inorganic salt composition described above. If the amount is below 0.01 part by weight, the addition does not produce a remarkable effect. Even if the amount exceeds 5.0 parts by weight, the effect of the addition is not improved any more.

A supercooling inhibitor can be added to the composition of this invention. The supercooling inhibitor may be added beforehand to the liquid mixture to be subjected to polymerization, or may be added after polymerization. However, in the case of conducting polymerization in the containers in which a heat-storage composition is to be contained finally, the supercooling inhibitor should be added beforehand to the liquid mixture to be subjected to polymerization.

As is well known, sodium tetraborate decahydrate is generally effective as a supercooling inhibitor. It may be used in such an amount that it is about 2–5% by weight based on the amount of the whole heat-storage material and it is not lower than the saturation solubility in the aqueous medium in the operation temperature range. Since the pH range in which sodium tetraborate decahydrate is stably present in an aqueous medium is from neutral to basic, it is desirable that, in the case where the medium will become acidic due to the monomers and polymer, the medium be neutralized with an alkali beforehand.

EXAMPLES

The present invention will be explained below in more detail by means of Examples, but the invention is not construed as being limited to these Examples.

Example 1

In a 100-ml beaker were placed 7.291 g of anhydrous sodium sulfate, 4.944 g of ammonium chloride, 0.900 g of sodium tetraborate decahydrate, 0.570 g of a 35% aqueous sodium polyoxyethylene alkylphenol ether sulfate solution (manufactured by Kao Corp.; trade name, EMAL NC-35), and 15.728 g of water. The beaker was shaken for 30 minutes with heating on a 40° C. water bath, and 0.800 g of a water-absorbing resin powder (manufactured by Sumitomo Chemical Co., Ltd.; trade name, SUMIKAGEL) was then added with stirring. The resulting mixture was immediately injected into a screw bottle made of glass and having a diameter of 33 mm and a height of 50 mm. As a result, the mixture turned into a hydrogel with no flowability after 3 minutes.

A thermocouple was inserted thereinto, and the gel was subjected to the heating cycle tests in which a heating/cooling cycle was repeated between 22° C. and −2° C. The freezing curve obtained during cooling at the 10th cycle is shown in FIG. 1, which curve is denoted by numeral 1. The freezing curve had one plateau, which appeared at a temperature of 7.6° C., i.e., in the range of 6°–14° C. The solidification curve obtained at the 100th cycle was completely the same.

The results are summarized in Table 1. In Table 1, as measures of melting point, the plateau-beginning point in the freezing curve is shown as the fusion-initiation temperature and the plateau-ending point therein is shown as the fusion-completed temperature.

Examples 2–4 and Comparative Examples 1–4

Compositions having the makeups shown in Table 1 were prepared in the same manner as in Example 1. The temperatures in the freezing curves obtained in the same heating cycle test as in Example 1 are as shown in Table 1.The freezing curve obtained during cooling at the 10th cycle in Comparative Example 1 is shown in FIG. 1, which curve is denoted by numeral 2.

Example 5

To 18.000 g of a 10 wt % aqueous sodium acrylate solution obtained by neutralizing acrylic acid to pH 7.5 with aqueous caustic soda solution was further added 15.100 g of water. Thereto were added with stirring at 30° C. 0.148 g of N,N'-methylenebisacrylamide, 15.342 g of anhydrous sodium sulfate, 11.558 g of ammonium chloride, 1.800 g of sodium tetraborate decahydrate, and 1.14 g of a 35% aqueous sodium polyoxyethylene alkylphenyl ether sulfate solution (manufactured by Kao Corp.; trade name, EMAL NC-35) to obtain a mixture. The molar proportions of the sodium sulfate (in terms of its anhydride) and the water in this mixture were as shown in Table 1.

This mixture was divided into two portions, and 0.060 g of ammonium peroxydisulfate and 0.060 g of sodium thiosulfate pentahydrate were added to one and the other portions, respectively. After each liquid was mixed, the two liquids were discharged through respective flow lines and injected into a screw bottle made of glass and having a diameter of 33 mm and a height of 50 mm, while the two flows were kept being mixed with each other by collision.

This was allowed to stand in a 25° C. atmosphere. Observation after 1 hour revealed that a crosslinking reaction had proceeded and the contents had turned into a homogeneous jelly-like elastic polymer.

Figure 2:
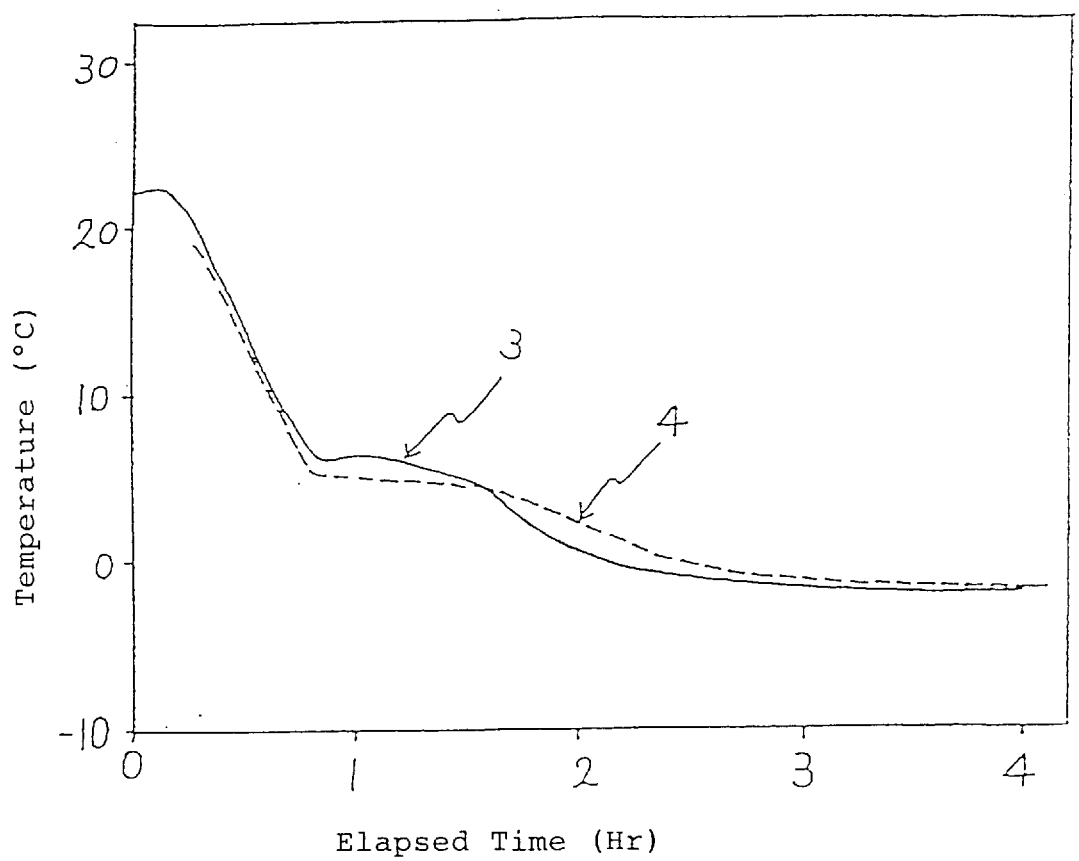
FIG. 2 illustrates freezing curves in the heating cycle tests comprising melting and freezing in Example 5 and Comparative Example 5.

A thermocouple was inserted into the polymer obtained, and the polymer was subjected to the heating cycle tests in which a heating/cooling cycle was repeated between 22° C. and −2° C. The freezing curve obtained during cooling at the 10th cycle is shown in FIG. 2, which curve is denoted by numeral 3. The freezing curve had one plateau, which appeared at a temperature of 6.3° C., i.e., in the range of 6°–14° C. The freezing curve obtained at the 100th cycle was completely the same.

Comparative Example 5

A jelly-like elastic polymer was obtained in a screw bottle made of glass in completely the same manner as in Example 5 except that the surfactant was not added. The freezing curve (10th cycle) obtained in the same measurement as in Example 5 is shown in FIG. 2, which curve is denoted by numeral 4. The freezing curve had a plateau at 5.2° C., outside the range of 6°–14° C. This behavior was completely the same as that in the 100th cycle.

Example 6

To 1.498 g of a 30 wt % aqueous sodium acrylate solution obtained by neutralizing acrylic acid to pH 7.5 with aqueous caustic soda solution was further added 12.179 g of water. Thereto were added 1.354 g of acrylamide, 0.019 g of N,N'-methylenebisacrylamide, and 0.581 g of a 35% aqueous sodium polyoxyethylene alkylphenyl ether sulfate solution (manufactured by Kao Corp.; trade name, EMAL NC-35). The mixture was stirred at room temperature for 10 minutes to dissolve.

Thereto were added 6.014 g of ammonium chloride and 0.821 g of sodium chloride. This mixture was stirred for 10 minutes with heating on a 35° C. water bath, and 7.981 g of anhydrous sodium sulfate was then added. The mixture was stirred with heating for further 30 minutes.

This was transferred to a 20° C. water bath, and 2.490 g of sodium tetraborate decahydrate was added. After the mixture was stirred for 2 hours while the system was kept open, it was transferred to a 40° C. water bath and stirred for 10 minutes. Subsequently, 0.300 g of a water-absorbing resin powder (manufactured by Sumitomo Chemical Co., Ltd.; trade name, SUMIKAGEL) was added, and this mixture was stirred for 2 minutes. To this mixture were then added a solution obtained by dissolving 0.030 g of potassium peroxydisulfate in 2.027 g of water and a solution obtained by dissolving 0.030 g of sodium sulfite in the same amount of water. As a result, the mixture turned into a jelly-like elastic solid after 30 seconds.

A thermocouple was inserted thereinto, and the solid was subjected to the heating cycle tests in which a heating/cooling cycle was repeated between 22° C. and −2° C. The solidification curve obtained at the 20th cycle had one plateau, which appeared at a temperature (solidifying point) of 7.6° C., i.e., in the range of 6°–14° C.

The freezing curve obtained at the 100th cycle was completely the same.

Example 7

A jelly-like elastic solid was obtained by conducting the same procedure as in Example 6 except that the 30 wt % aqueous sodium acrylate solution, acrylamide, and water were added in amounts of 3.411 g, 0.775 g, and 10.802 g, respectively. The freezing point was 7.6° C.

Example 8

A jelly-like elastic solid was obtained by conducting the same procedure as in Example 6 except that the 30 wt % aqueous sodium acrylate solution was not added and acrylamide and water were added in amounts of 1.800 g and 13.145 g, respectively. The freezing point was 6.0° C.

Example 9

The same procedure as in Example 6 is conducted until the addition of 0.300 g of the water-absorbing resin powder (manufactured by Sumitomo Chemical Co., Ltd.; trade name, SUMIKAGEL) and 2-minute stirring. Thus, a mixture is obtained.

This mixture is divided into two portions, and a solution obtained by dissolving potassium peroxodisulfate in water and a solution obtained by dissolving sodium sulfite in water are added to one and the other portions, respectively. After each liquid is mixed, the two liquids are discharged through respective flow lines and injected into a glass screw bottle having a diameter of 33 mm and a height of 50 mm, while the two liquids are kept being mixed with each other by collision. This is allowed to stand in a 25° C. atmosphere, upon which a crosslinking reaction proceeds and the contents turn into a homogeneous jelly-like elastic solid. The jelly-like elastic solid obtained has the same properties as in Example 6.

Example 10

In a 50-ml screw bottle made of glass were placed 15.193 g of water, 0.577 g of a 35% aqueous sodium polyoxyethylene alkylphenol ether sulfate solution (manufactured by Kao Corp.; trade name, EMAL NC-35), 6.013 g of ammonium chloride, and 0.822 g of sodium chloride. This mixture was stirred for 10 minutes with heating on a 35° C. water bath, and 7.982 g of anhydrous sodium sulfate was then added. The mixture was stirred with heating for further 30 minutes.

This was transferred to a 20° C. water bath, and 2.490 g of sodium tetraborate decahydrate was added. This mixture was stirred for 2 hours, while the system was kept open. Subsequently, 1.802 g of a partially hydrolyzed polyacrylamide (a polymeric coagulant manufactured by Sumitomo Chemical Co., Ltd.; trade name, SUMIFLOC FN-15H) was added and the mixture was stirred with a spatula until it became jelly-like.

A thermocouple was inserted thereinto, and the solid was subjected to the heating cycle tests in which a heating/cooling cycle was repeated between 22° C. and −2° C. The freezing curve obtained at the 20th cycle had one plateau, which appeared at a temperature of 7.6° C., i.e., in the range of 6°–14° C. The freezing curve obtained at the 100th cycle was completely the same.

Comparative Example 6

A jelly-like elastic polymer was obtained in a screw bottle made of glass in completely the same manner as in Example 10 except that the surfactant was not added. The freezing curve obtained in the same heating cycle tests test as in Example 10 had one plateau, which appeared at a temperature of 5.8° C., outside the range of 6°–14° C. The freezing curve obtained at the 100th cycle was completely the same.

In Table 1, the abbreviations denote the following.

1. Compositions of Inorganic Salt and Polymer

| Inorganic Salt: | Molar proportion (per one mole of sodium sulfate decahydrate) |
| --- | --- |
| Polymer: | Acrylamide/sodium acrylate (molar ratio) |
| A1: | ammonium chloride, 1.8 mol; water, 7.0 mol acrylamide/sodium acrylate = 0/100 |
| A2: | ammonium chloride, 2.0 mol; water, 6.0 mol acrylamide/sodium acrylate = 0/100 |
| B1: | ammonium chloride, 2.0 mol; sodium chloride, 0.25 mol; water, 5.0 mol acrylamide/sodium acrylate = 80/20 |
| B2: | ammonium chloride, 2.0 mol; sodium chloride, 0.25 mol; water, 5.0 mol acrylamide/sodium acrylate = 50/50 |
| B3: | ammonium chloride, 2.0 mol; sodium chloride, 0.25 mol; water, 5.0 mol acrylamide/sodium acrylate = 100/0 |
| B4: | ammonium chloride, 2.0 mol; sodium chloride, 0.25 mol; water, 5.0 mol acrylamide/sodium acrylate = 95/5 |

(employing partially hydrolyzed polyacrylamide)

2. Kind and Amount of Surfactant

C: Sodium polyoxyethylene nonylphenyl ether sulfate (manufactured by Kao Corp.; trade name, EMAL NC-35) 1 wt %

D: Polyoxyethylene alkylamine (manufactured by Kao Corp.; trade name, AMEET 308) 1 wt %

E: Polyoxyethylene monooleate (manufactured by Kao Corp.; trade name, EMANON 4110) 1 wt %

F: Polyoxyethylene sorbitan monolaurate (manufactured by Kao Corp.; trade name, REODOL SUPER TW-L120) 1 wt %

G: Sodium dodecylbenzenesulfonate (manufactured by Kao Corp.; trade name, NEOPELEX F-25) 1 wt %

H: Sorbitan sesquioleate (manufactured by Kao Corp.; trade name, REODOL AO-15) 1 wt %

I: Special carboxylic acid type (manufactured by Kao Corp.; trade name, LATEMUL ASK) 1 wt %

TABLE 1

| Example No. | Composition of inorganic salt and polymer | Kind and amount of surfactant | Fusion-initiation temperature (°C.) | Fusion-completed temperature (°C.) | Freezing point (°C.) |
| --- | --- | --- | --- | --- | --- |
| Example 1 | A1 | C | 9.2 | 12.3 | 7.6 |
| Example 2 | A1 | D | 10.4 | 12.6 | 7.2 |
| Example 3 | A1 | E | 10.8 | 14.0 | 6.0 |
| Example 4 | A1 | F | 9.8 | 12.7 | 6.9 |
| Comparative Example 1 | A1 | none | 9.7 | 13.0 | 4.6, 5.8 |
| Comparative Example 2 | A1 | G | 10.0 | 12.3 | 5.1, 9.0 |
| Comparative Example 3 | A1 | H | 10.5 | 13.3 | 5.2, 6.6 |
| Comparative Example 4 | A1 | I | 8.7 | 12.3 | 4.2, 9.4 |
| Example 5 | A2 | C | 10.8 | 13.7 | 6.3 |
| Comparative Example 5 | A2 | none | 10.2 | 14.0 | 4.8, 5.2 |
| Example 6 | B1 | C | 8.8 | 14.0 | 7.6 |
| Example 7 | B2 | C | 10.0 | 14.0 | 7.6 |
| Example 8 | B3 | C | 8.6 | 13.8 | 6.0 |
| Example 10 | B4 | C | 10.5 | 11.4 | 7.6 |
| Comparative Example 10 | B4 | none | 11.0 | 11.4 | 5.8 |

POSSIBILITY OF INDUSTRIAL APPLICATION

The heat-storage composition of the present invention, which comprises a specific inorganic salt composition, a water swellable crosslinked polymer or water-soluble acrylic polymer, and a surfactant having a polyoxyalkylene chain, has a melting point and a freezing point in a temperature range suitable for cooling in air conditioning, with the melting point being properly apart from the freezing point, and also has the stability necessary for withstanding repetitions of melting/freezing in long-term use.

We claim:

1. A heat-storage composition consisting essentially of
   (i) 85.0–99.5 parts by weight of an inorganic salt composition consisting essentially of sodium sulfate and, per one mole of the sodium sulfate in terms of its anhydrous form, 1.5–2.5 mole of ammonium chloride, and 10–27 mole of water, (ii) 0.5–15.0 parts by weight of a partially hydrolyzed polyacrylamide, and (iii) 0.01–5.0 parts by weight of a surfactant selected from the group consisting of a polyoxyethylene alkyl ether sulfuric ester salt and a polyoxyethylene alkylphenyl ether sulfuric ester salt.

2. A heat-storage composition consisting essentially of (i) 85.0–99.5 parts by weight of an inorganic salt composition consisting essentially of sodium sulfate and, per one mole of the sodium sulfate in terms of its anhydrous form, 1.5–2.5 mole of ammonium chloride, 10–27 mole of water, and sodium chloride, (ii) 0.5–15.0 parts by weight of a partially hydrolyzed polyacrylamide, and (iii) 0.01–5.0 parts by weight of a surfactant selected from the group consisting of a polyoxyethylene alkyl ether sulfuric ester salt and a polyoxyethylene alkylphenyl ether sulfuric ester salt.

* * * * *